United States Patent
Okazaki

(10) Patent No.: US 10,780,607 B2
(45) Date of Patent: Sep. 22, 2020

(54) PLASTICIZING UNIT SUPPLYING A PRESCRIBED AMOUNT OF FIBER MATERIAL PIECES TO HEATING CYLINDER USING A VACUUM OR BLOWER FIBER TRANSFER DEVICE

(71) Applicant: Toyo Machinery & Metal Co., Ltd., Akashi-shi, Hyogo (JP)

(72) Inventor: Masanori Okazaki, Akashi (JP)

(73) Assignee: Toyo Machinery & Metal Co., Ltd., Akashi-shi (JP)

(*) Notice: Subject to any disclaimer, the term of this patent is extended or adjusted under 35 U.S.C. 154(b) by 357 days.

(21) Appl. No.: 15/566,968

(22) PCT Filed: Apr. 7, 2016

(86) PCT No.: PCT/JP2016/061454
§ 371 (c)(1),
(2) Date: Oct. 16, 2017

(87) PCT Pub. No.: WO2016/170996
PCT Pub. Date: Oct. 27, 2016

(65) Prior Publication Data
US 2018/0099434 A1 Apr. 12, 2018

(30) Foreign Application Priority Data
Apr. 22, 2015 (JP) .................. 2015-087630

(51) Int. Cl.
*B29B 7/90* (2006.01)
*B29C 31/02* (2006.01)
(Continued)

(52) U.S. Cl.
CPC .............. *B29B 7/905* (2013.01); *B29B 7/248* (2013.01); *B29C 31/02* (2013.01);
(Continued)

(58) Field of Classification Search
CPC ........... B29B 7/905; B29B 7/248; B29B 7/90; B29B 7/86; B29B 7/14; B29B 7/24;
(Continued)

(56) References Cited

U.S. PATENT DOCUMENTS 2,888,155 A 5/1959 Raymer et al.
3,405,426 A * 10/1968 Donald .................. B29C 48/33
425/114

(Continued)

FOREIGN PATENT DOCUMENTS

DE 1 557 158 B1 12/1970
DE 2213305 * 9/1972

(Continued)

OTHER PUBLICATIONS

Machine Translation of JP 2013-230582 A (Year: 2013).*

(Continued)

*Primary Examiner* — Charles Cooley
(74) *Attorney, Agent, or Firm* — Crowell & Moring LLP

(57) ABSTRACT

In order to be capable of reliably supplying a prescribed amount of fiber materials into a heating cylinder for each cycle and continuously manufacturing a homogeneous composite material, a plasticizing unit is provided with a fiber supply device 3 that supplies prescribed amount of fiber materials A2 having a prescribed length into the heating cylinder 1. The fiber supply device 3 is provided with: a cutting section 12 that cuts off a long fiber material A1 pulled out from a reel 11 into a prescribed length; a pressure-feeding section 13 that presses the fiber materials A2 having the prescribed length cut off by the cutting section 12 into the heating cylinder 1; and a fiber transfer device 45 that forcibly transfers the fiber materials A2 accumulated in the cutting section 12 to the pressure-feeding section 13. The pressure-feeding section 13 is constituted by a press cylinder 41 and a press piston 42, and the fiber transfer device 45 is constituted by a vacuum device.

10 Claims, 5 Drawing Sheets

(51) Int. Cl.
  *B29B 7/24* (2006.01)
  *B29C 48/285* (2019.01)
  *B29B 7/14* (2006.01)
  *B29K 105/12* (2006.01)
  *B29B 7/86* (2006.01)
  *B29C 45/18* (2006.01)
  *B29C 48/80* (2019.01)
  *B29C 48/395* (2019.01)

(52) U.S. Cl.
  CPC ............ *B29C 48/2886* (2019.02); *B29B 7/14* (2013.01); *B29B 7/24* (2013.01); *B29B 7/86* (2013.01); *B29B 7/90* (2013.01); *B29C 45/1816* (2013.01); *B29C 48/395* (2019.02); *B29C 48/832* (2019.02); *B29C 2793/00* (2013.01); *B29K 2105/12* (2013.01)

(58) Field of Classification Search
  CPC . B29C 31/02; B29C 48/2886; B29C 2793/00; B29C 45/1816; B29C 48/832; B29C 48/395; B29K 2105/12
  See application file for complete search history.

(56) References Cited

U.S. PATENT DOCUMENTS

| | | | | |
|---|---|---|---|---|
| 3,409,711 A * | 11/1968 | Pashak | ................ | B29C 48/297 264/143 |
| 3,453,356 A * | 7/1969 | Raymond, Jr. | ....... | B29C 48/395 264/143 |
| 3,520,027 A * | 7/1970 | Bird | .................... | B29C 45/1816 425/131.1 |
| 3,577,494 A * | 5/1971 | Chisholm et al. | ........ | B29B 9/06 264/143 |
| 3,732,345 A * | 5/1973 | Amos et al. | ........ | B29C 45/0005 264/328.14 |
| 3,746,489 A * | 7/1973 | Rizzi | ...................... | B29B 7/426 425/205 |
| 3,932,980 A * | 1/1976 | Mizutani | ................. | B01F 13/00 53/111 R |
| 4,003,498 A * | 1/1977 | Moneghan | .............. | B29C 43/34 222/1 |
| 4,175,870 A * | 11/1979 | Warzel | ................... | B29B 17/00 366/76.91 |
| 4,260,568 A * | 4/1981 | Warzel | ............... | B29C 48/2886 264/211.22 |
| 4,439,387 A * | 3/1984 | Hawley | .................. | B29C 70/20 264/108 |
| RE32,772 E * | 10/1988 | Hawley | ............. | B29C 45/14631 264/108 |
| 4,806,298 A * | 2/1989 | Wilkinson | ........... | B26D 7/2614 118/36 |
| 4,848,915 A * | 7/1989 | Fintel | .................... | B29C 48/288 366/76.2 |
| 4,883,624 A * | 11/1989 | Spaay | ..................... | B29C 70/12 264/112 |
| 4,919,872 A * | 4/1990 | Fintel | .................... | B29C 48/05 264/103 |
| 5,011,523 A * | 4/1991 | Roncato | .................... | B29B 9/14 65/441 |
| 5,110,275 A * | 5/1992 | Scheuring | ............. | B29C 48/022 425/113 |
| 5,165,941 A * | 11/1992 | Hawley | .................. | B29C 48/38 425/148 |
| 5,185,117 A * | 2/1993 | Hawley | .................. | B29C 48/38 264/211.12 |
| 5,358,680 A * | 10/1994 | Boissonnat | ......... | B29C 45/1816 264/177.2 |
| 5,595,696 A * | 1/1997 | Schlarb | .................... | B29B 9/06 264/118 |
| 5,653,534 A * | 8/1997 | Matsumoto | ......... | B29C 45/1816 366/76.1 |
| 5,776,281 A * | 7/1998 | Evans | ...................... | B27N 3/28 156/244.17 |
| 5,879,602 A * | 3/1999 | Scheuring | ............. | B29B 15/122 264/136 |
| 6,186,769 B1* | 2/2001 | Hawley | ................. | B29B 15/122 425/587 |
| 6,364,518 B1* | 4/2002 | Gleich | ................ | B29C 48/2886 366/86 |
| 6,419,864 B1* | 7/2002 | Scheuring | ............. | B29C 48/767 264/102 |
| 6,431,847 B1* | 8/2002 | Hawley | ................. | B29B 15/122 425/113 |
| 6,444,153 B1* | 9/2002 | Shah | .................... | B29C 45/1816 264/211.21 |
| 6,479,002 B1* | 11/2002 | Becker | ...................... | B27N 3/28 264/148 |
| 6,558,603 B2* | 5/2003 | Wobbe | ................ | B29C 45/0005 264/297.2 |
| 6,776,596 B2* | 8/2004 | Brussel | ............... | B29B 17/0036 425/113 |
| 6,817,851 B2* | 11/2004 | Brussel | ............... | B29B 17/0036 425/114 |
| 7,004,743 B2* | 2/2006 | Kapfer | .................... | B29C 31/08 425/166 |
| 7,390,118 B2* | 6/2008 | MacDonald | .......... | B29C 45/581 366/80 |
| 7,691,305 B2* | 4/2010 | Sutton | ................. | B29C 45/0005 264/211 |
| 7,993,122 B2* | 8/2011 | Bowen | .................. | B29C 48/156 425/113 |
| 10,011,048 B1* | 7/2018 | Johnston, VII | ........... | B29B 7/60 |
| 10,486,351 B2* | 11/2019 | Kariya | .................... | B29C 45/50 |
| 10,576,662 B2* | 3/2020 | Johnston, VII | ........... | B29B 7/60 |
| 2002/0079607 A1* | 6/2002 | Hawley | .................... | B29C 48/38 264/136 |
| 2004/0234639 A1* | 11/2004 | Sieverding | ............. | B29C 48/40 425/114 |
| 2010/0103763 A1* | 4/2010 | Ponzielli | ............... | B01F 3/1221 366/76.6 |
| 2011/0002190 A1* | 1/2011 | Tardif | ................. | B29C 48/2886 366/160.1 |
| 2011/0272847 A1* | 11/2011 | Hehl | .................... | B29C 45/1816 264/163 |
| 2014/0065257 A1* | 3/2014 | Izawa | ................. | B29C 45/1816 425/551 |
| 2017/0312954 A1* | 11/2017 | Nobuta | ..................... | B29B 7/90 |

FOREIGN PATENT DOCUMENTS

| | | |
|---|---|---|
| DE | 695 24 915 T2 | 8/2002 |
| DE | 10 2008 061 270 A1 | 6/2010 |
| EP | 0 706 873 A | 4/1996 |
| EP | 0 960 715 A2 | 12/1999 |
| EP | 0 960 715 A3 | 12/1999 |
| EP | 0 706 873 B1 | 1/2002 |
| EP | 2 979 837 A1 | 2/2016 |
| EP | 2 987 603 A1 | 2/2016 |
| GB | 2 100 178 A | 12/1982 |
| JP | 62-19411 A | 1/1987 |
| JP | 3-219935 A | 9/1991 |
| JP | 5-253970 A | 10/1993 |
| JP | 9-150436 A | 6/1997 |
| JP | 2002-192526 A | 7/2002 |
| JP | 2012-511445 A | 5/2012 |
| JP | 2013-226672 A | 11/2013 |
| JP | 2013-230582 A | 11/2013 |
| WO | WO 2010/075936 A1 | 7/2010 |
| WO | WO 2014/155409 A1 | 10/2014 |
| WO | WO 2014/170932 A1 | 10/2014 |

OTHER PUBLICATIONS

Machine translation of JP 62-019411 A (Year: 1987).*
Japanese-language Office Action issued in counterpart Japanese Application No. 2015-087630 dated May 21, 2019 with English translation (five (5) pages).

(56) References Cited

OTHER PUBLICATIONS

International Search Report (PCT/ISA/210) issued in PCT Application No. PCT/JP2016/061454 dated Jul. 5, 2016 with English translation (four (4) pages).
Japanese-language Written Opinion (PCT/ISA/210) issued in PCT Application No. PCT/JP2016/061454 dated Jul. 5, 2016 (four (4) pages).
Cover page of EP 2 373 472 A1 published Oct. 12, 2011 (one (1) page).
Extended European Search Report issued in counterpart European Application No. 16783017.3 dated Sep. 26, 2018 (nine pages).

* cited by examiner

PLASTICIZING UNIT SUPPLYING A PRESCRIBED AMOUNT OF FIBER MATERIAL PIECES TO HEATING CYLINDER USING A VACUUM OR BLOWER FIBER TRANSFER DEVICE

TECHNICAL FIELD

The present invention relates to a plasticizing unit which is used for plasticizing a resin material. Particularly, it relates to a plasticizing unit which is suitable for manufacturing a composite material in which a fiber material has been kneaded into a resin material.

BACKGROUND ART

In the background art, there have been known various plasticizing units each provided for manufacturing a composite material in which a fiber material such as carbon fiber, glass fiber, plant fiber or chemical fiber has been kneaded into a resin material. Plasticizing methods of the composite materials include a method for supplying, into a heating cylinder, a pellet-type raw resin in which a fiber material has been kneaded in advance (e.g. see paragraphs about Background Art in Patent Literature 1), a method for supplying a mixture of a pellet-type raw resin and a shortly cut fiber material into a heating cylinder through a common raw material supply port (e.g. see paragraphs about Description of Embodiment in Patent Literature 1) and a method for supplying a pellet-type raw resin and a long fiber material wound on a reel into a heating cylinder through separate raw material supply ports respectively (e.g. see Abstract in Patent Literature 2).

Strength of a molded product becomes higher as the fiber material kneaded into the resin is longer. Accordingly, in order to manufacture such a molded product with high strength, it is the most desirable that a plasticizing unit uses the method for supplying the pellet-type raw resin and the long fiber material wound on the reel into the heating cylinder through the separate raw material supply ports respectively.

CITATION LIST

Patent Literature

Patent Literature 1: JP-A-2002-192526
Patent Literature 2: JP-A-2012-511445

SUMMARY OF INVENTION

Technical Problem

However, it is in fact difficult to supply the long fiber material into the heating cylinder stably. This type of plasticizing unit has not been provided practically yet. It is because the long fiber material which has been sent into the heating cylinder is cut by shearing force or friction force generated due to rotation of a screw. However, the degree of the cutting varies depending on viscosity of the resin in the heating cylinder or change of the number of rotations of the screw. Therefore, it is difficult to manufacture a homogeneous composite material stably.

The invention has been accomplished in consideration of such actual circumstances of the background art. An object of the invention is to provide a plasticizing unit which is capable of reliably supplying a prescribed amount of fiber material pieces into a heating cylinder each cycle and therefore continuously manufacturing a homogeneous composite material.

Solution to Problem

In order to solve the foregoing problem, the invention provides a plasticizing unit including: a heating cylinder; a screw that is received rotatably inside the heating cylinder; a resin supply hole and a fiber supply hole that are opened in the heating cylinder; and a fiber supply device that supplies a fiber material into the heating cylinder through the fiber supply hole; wherein: the fiber supply device includes at least one reel on which a long fiber material is wound, a cutting section by which the long fiber material pulled out from the reel is cut off into a prescribed length, and a pressure-feeding section by which fiber material pieces each cut in the prescribed length by the cutting section are pressed into the heating cylinder through the fiber supply hole; and the pressure-feeding section has a pressing cylinder that is attached to the heating cylinder so that one end of the pressing cylinder can communicate with the fiber supply hole, a pressing piston that is received slidably inside the pressing cylinder, a fiber supply pipe through which a head chamber of the pressing cylinder and the cutting section can communicate with each other, and a fiber transfer device by which the fiber material pieces staying in the cutting section and inside the fiber supply pipe are transferred into the head chamber of the pressing cylinder.

The plasticizing unit having the aforementioned configuration repeats a plasticizing step of plasticizing a resin material inside the heating cylinder, a cutting step of cutting off the long fiber material pulled out from the reel into the prescribed length, a fiber supplying step of supplying the fiber material pieces each cut in the prescribed length into the heating cylinder, and a kneading step of kneading the resin material and the fiber material pieces inside the heating cylinder. The screw is driven and rotated to perform and execute the plasticizing step and the kneading step until a fixed amount of a composite material is accumulated in a front end portion of the heating cylinder. The cutting section is driven to perform the cutting step. The pressure-feeding section is driven to perform the fiber supplying step. Accordingly, in order to manufacture a homogeneous composite material through all the steps, it is particularly important that a prescribed amount of the fiber material pieces is reliably supplied into the heating cylinder during the plasticizing step. By the pressure-feeding section provided in the fiber supply device, the prescribed amount of the fiber material pieces obtained by the cutting step can be forcibly pressed into the heating cylinder each cycle. Accordingly, a ratio of the fiber material contained in the plasticized resin can be made stable so that a homogeneous composite material can be manufactured.

However, the cut fiber material pieces may be shaped like feathers and charged with static electricity. Accordingly, the cut fiber material pieces may be gathered like a ball in the cutting section or inside the fiber supply pipe or deposited on a wall surface of the cutting section or the fiber supply pipe. Therefore, even when the prescribed amount of the fiber material pieces is cut by the cutting section each cycle, the amount of the fiber material pieces directly supplied into the heating cylinder is apt to vary from one cycle to another. To solve this problem, the fiber transfer device provided in the fiber supply device is configured to forcibly transfer the fiber material pieces inside the fiber supply pipe into the head chamber of the pressing cylinder. With this configuration, the prescribed amount of the fiber material pieces cut by the cutting section can be transferred into the head chamber of the heating cylinder reliably. Accordingly, the ratio of the fiber material added into the plasticized resin each cycle can be uniform. As a result, a homogeneous composite material can be manufactured stably.

In addition, the invention provides a plasticizing unit having the aforementioned configuration, wherein: a vacuum device that is coupled to the pressing cylinder to suck the fiber material pieces staying in the cutting section and inside the fiber supply pipe into the head chamber of the pressing cylinder is provided as the fiber transfer device.

According to this configuration, the fiber material pieces that are gathered like a ball in the cutting section or inside the fiber supply pipe or deposited on the wall surface of the cutting section or the fiber supply pipe can be forcibly transferred into the head chamber of the pressing cylinder by sucking force of the vacuum device. Accordingly, the fiber amount for each cycle can be made stable so that a molded product of a homogeneous composite material can be manufactured stably.

In addition, the invention provides a plasticizing unit having the aforementioned configuration, wherein: an air exhaust pipe communicating with the vacuum device is provided on a rod chamber side of the pressing cylinder, and the vacuum device sucks the fiber material pieces staying in the cutting section and inside the fiber supply pipe through a gap between an inner surface of the pressing cylinder and an outer surface of the pressing piston.

According to this configuration, the gap between the inner surface of the pressing cylinder and the outer surface of the pressing piston is made so small that the fiber material pieces cannot pass through the gap easily. In this manner, a filter for preventing the fiber material pieces from being diffused can be dispensed with. Consequently, the fiber supply device and hence the plasticizing unit can be implemented at low cost.

In addition, the invention provides a plasticizing unit having the aforementioned configuration, wherein: an air exhaust pipe communicating with the vacuum device is provided on a head chamber side of the pressing cylinder, and a filter for preventing the fiber from being diffused is provided in the air exhaust pipe.

According to this configuration, stronger sucking force of the vacuum device can be applied to the fiber material pieces staying in the cutting section and inside the fiber supply pipe in comparison with the case where the air exhaust pipe communicating with the vacuum device is provided on the rod chamber side of the pressing cylinder. Thus, the fiber material pieces can be transferred into the head chamber of the pressing cylinder more reliably.

In addition, the invention provides a plasticizing unit having the aforementioned configuration, wherein: an air blowing device for blowing air into the fiber supply pipe is provided as the fiber transfer device, and an air exhaust pipe is provided on a head chamber side of the pressing cylinder.

According to this configuration, air is blown into the fiber supply pipe so that internal pressure of the fiber supply pipe can be made negative. Thus, the fiber material pieces staying in the cutting section can be drawn into the fiber supply pipe. In addition, the fiber material pieces staying in the fiber supply pipe can be transferred into the head chamber of the pressing cylinder by a current of the air. Accordingly, the amount of the fiber staying in the cutting section or inside the fiber supply pipe can be reduced so that the amount of the fiber material pieces transferred each cycle can be made uniform.

In addition, the invention provides a plasticizing unit having the aforementioned configuration, wherein: the cutting section has retention rollers that retain a front end portion of the fiber material pulled out from the reel and one of which is driven to rotate in one direction intermittently to feed out a predetermined length of the fiber material in each intermittent rotation, and a cutter that is disposed to be opposed to the one retention roller so that a cutting edge of the cutter can be pressed against a surface of the one retention roller to thereby cut off the front end portion of the fiber material fed out by the one retention roller.

According to this configuration, the cutter is disposed to be opposed to one of the retention rollers, and the fiber material is cut off between the roller and the cutter. Accordingly, it is unnecessary to dispose another member in a position opposed to the cutter. Consequently, the fiber supply device and hence the plasticizing unit can be implemented compactly.

In addition, the invention provides a plasticizing unit having the aforementioned configuration, wherein: a flat blade cutter having a linear cutting edge is used as the cutter.

According to this configuration, only a reciprocating drive mechanism that drives and reciprocates the flat blade cutter in a direction approaching one of the retention rollers and a direction leaving the one of the retention rollers is required to be provided as a cutter drive mechanism. Consequently, the fiber supply device and hence the plasticizing unit can be implemented compactly and at low cost.

In addition, the invention provides a plasticizing unit having the aforementioned configuration, wherein: a rotary cutter having a circular or arc cutting edge is used as the cutter.

According to this configuration, a rotation mechanism and a reciprocating drive mechanism of the rotary cutter are required. However, higher cutting capability can be expected in comparison with the case where the flat blade cutter is used.

In addition, the invention provides a plasticizing unit having the aforementioned configuration, wherein: the cutting section includes a hammer that gives impulse force to the cutter pressed against the fiber material so that the fiber material can be cut off by the impulse force given to the cutter.

According to this configuration, the fiber material can be cut off by the impulse force given by the hammer. Accordingly, the fiber material can be cut off more easily and more reliably in comparison with the case where the cutter is merely pressed.

Advantageous Effect of Invention

In the plasticizing unit according to the invention, the pressure-feeding section for the fiber material pieces includes the pressing cylinder, the pressing piston, and the fiber transfer device which transfers the fiber material pieces staying in the cutting section and inside the fiber supply pipe into the head chamber of the pressing cylinder. Consequently, a prescribed amount of the fiber material pieces can be supplied into the heating cylinder reliably so that a homogeneous composite material can be manufactured continuously.

DESCRIPTION OF EMBODIMENT

An embodiment of a plasticizing unit according to the invention will be described below with reference to the drawings.

Figure 1:
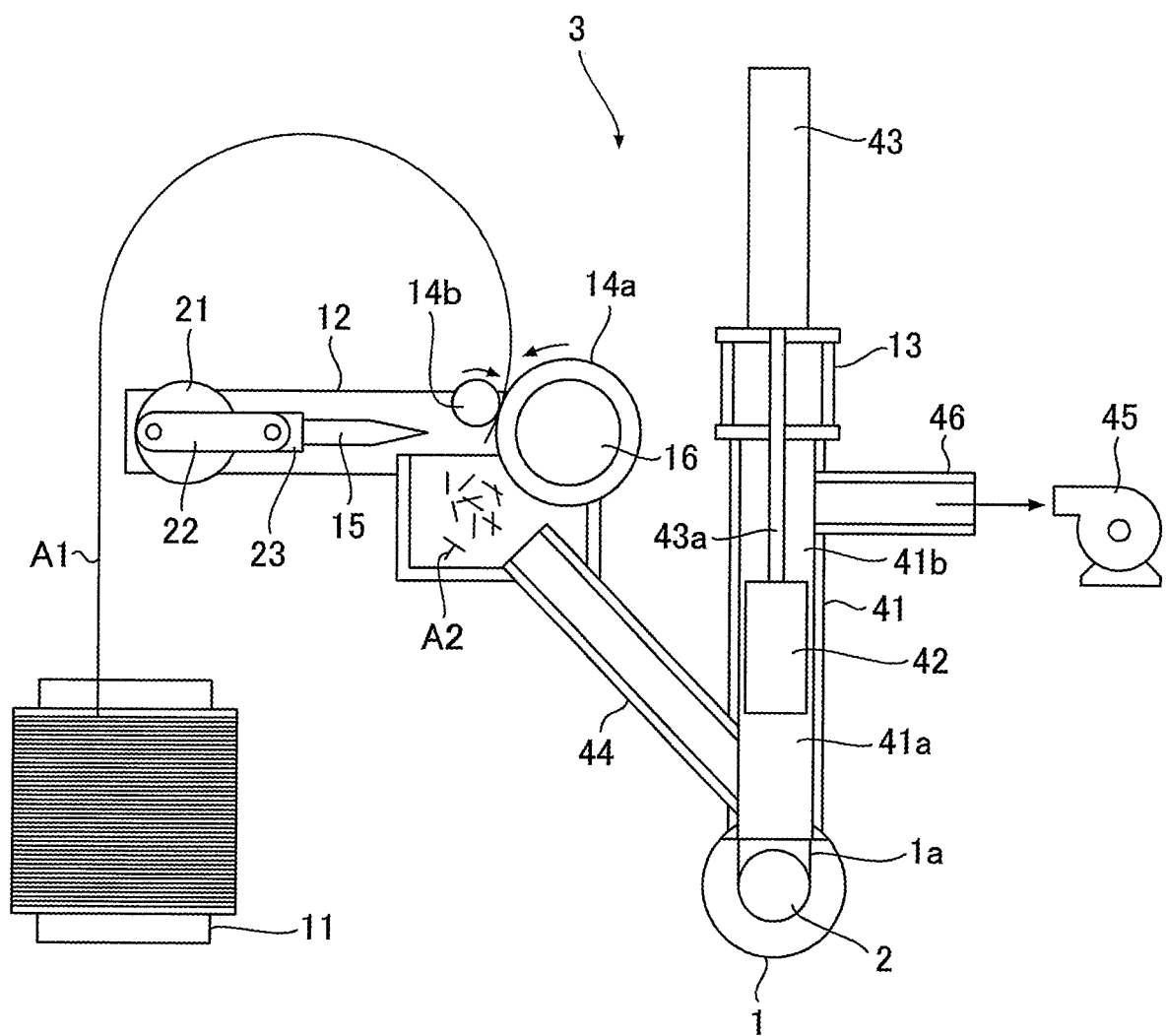
FIG. 1 A configuration view of a plasticizing unit according to an embodiment.

FIG. 1 shows the configuration of the plasticizing unit according to the embodiment. As apparent from the drawing, the plasticizing unit in this example has a heating cylinder 1, a screw 2, and a fiber supply device 3. The screw 2 is received rotatably and movably forward/backward inside the heating cylinder 1. The fiber supply device 3 supplies fiber material pieces A2 into the heating cylinder 1. Each of the fiber material pieces A2 has a prescribed length.

The heating cylinder 1 is formed into a circularly cylindrical shape with an internal diameter large enough to receive the screw 2 rotatably and movably forward/backward therein. A fiber supply hole 1a is made and provided on a front end side of a longitudinally central portion of the heating cylinder 1. In addition, a not-shown resin supply hole is made and provided on a rear end side of the longitudinally central portion. Incidentally, a not-shown heater is wound around the heating cylinder 1 to heat the heating cylinder 1 to a suitable temperature at which a resin material supplied into the heating cylinder 1 through the resin supply hole can be melted.

The screw 2 is similar to a screw provided in a screw in-line type injection device. Screw flights are formed at a required pitch in the longitudinal direction. When the screw 2 is driven and rotated inside the heating cylinder 1, the resin material (including the fiber material pieces A2 after the fiber material pieces are supplied) inside the heating cylinder 1 is kneaded, and friction heat and shearing heat occur in the resin material. The resin material inside the heating cylinder 1 is plasticized by the friction heat and the shearing heat which have occurred internally and heat transfer from the heater wound around the heating cylinder 1. A composite material made from the plasticized resin and the fiber material which have been kneaded inside the heating cylinder 1 is transferred sequentially to the front of the heating cylinder 1 by a feed function of the screw 2 and accumulated in a resin reservoir portion provided at a frontmost end portion of the heating cylinder 1. When the screw 2 is driven and moved forward after the plasticization and kneading step is completed, the composite material of the plasticized resin and the fiber material accumulated in the resin reservoir portion is discharged to the outside through a not-shown discharge port which is opened at the front end of the heating cylinder 1.

The fiber supply device 3 includes a reel 11, a cutting section 12, and a pressure-feeding section 13. A long fiber material A1 is wound on the reel 11. The long fiber material A1 pulled out from the aforementioned reel 11 is cut off so that fiber material pieces A2 each having a prescribed length can be obtained. The fiber material pieces A2 each cut in the prescribed length by the cutting section 12 are pressed into the heating cylinder 1 through the fiber supply hole 1a. Incidentally, in the example of FIG. 1, only one reel 11 is provided. However, it is a matter of course that a plurality of reels 11 may be provided. It is rather normal that the plurality of reels 11 are provided. For example, a material obtained by bundling several thousands of element wires each having a fiber diameter of 10 μm to 24 μm can be used as the fiber material A1.

The cutting section 12 includes retention rollers 14a and 14b and a cutter 15. The retention rollers 14a and 14b retain while sandwiching a front end portion of the long fiber material A1 pulled out from the reel 11. The cutter 15 is disposed on a straight line passing through a rotation center of one retention roller 14a. Incidentally, one guide roller or a plurality of guide rollers may be provided between the reel 11 and the retention rollers 14a and 14b. In addition, it is desirable that the cutting section 12 is entirely covered with a cover in order to prevent the fiber material pieces A2 from scattering. Further, it is desirable that a static electricity eliminating device is additionally provided in the cutting section 12 in order to prevent the fiber material pieces A2 from being deposited due to static electricity.

Of the two retention rollers 14a and 14b, one retention roller 14a is a driving roller rotated by a motor 16, and the other retention roller 14b is a driven roller rotated in accordance with the rotation of the one retention roller 14a. The retention roller 14a is driven to rotate intermittently in a direction of feeding out the long fiber material A1 so as to feed out a prescribed length of the long fiber material A1 every rotation. The prescribed length has been set in advance. A rotation amount of the retention roller 14a, i.e. a feeding-out amount of the long fiber material A1 is adjusted in accordance with required physical properties of a composite material which is intended to be manufactured.

As the cutter 15, a flat blade cutter having a linear cutting edge may be used, or a rotary cutter having a circular or arc cutting edge may be used. When the flat blade cutter is used, the cutting edge is disposed to face the rotation center of the retention roller 14a. In addition, when the rotary cutter is used, a rotary face of the cutter 15 is disposed on the straight line passing through the rotation center of the retention roller 14a. When the flat blade cutter is used as the cutter 15, only a reciprocating drive mechanism for driving and reciprocating the flat blade cutter in a direction approaching the retention roller 14a and a direction leaving the retention roller 14a is required to be provided as a cutter drive mechanism. Consequently, the configuration of the fiber supply device 3 can be simplified so that the plasticizing unit can be implemented compactly and at low cost. In addition, when the rotary cutter is used as the cutter 15, a rotation mechanism and a reciprocating drive mechanism of the cutter 15 are required. However, the fiber material A1 is cut off by resultant force of rotating force and pressing force of the cutter 15. Accordingly, higher cutting capability can be expected in comparison with the case where the flat blade cutter is used.

Whether the cutter 15 is the flat blade cutter or the rotary cutter, the cutter 15 is attached to a required cutter drive mechanism to be driven and reciprocated in the direction approaching the retention roller 14a and the direction leaving the retention roller 14a. In the example of FIG. 1, the cutter drive mechanism is constituted by a slider crank mechanism including a crank 21, a rod 22, and a slider 23. The rod 22 is rotatably coupled to the crank 21 at its one end. The slider 23 is rotatably coupled to the other end of the rod 22 and also serves as a cutter holder. The cutter 15 is attached to the slider 23 with its cutting edge facing outward. An operating range of the cutter 15 is adjusted so that the cutting edge of the cutter 15 can abut against the surface of the retention roller 14a or that the cutting edge of the cutter 15 can move forward up to a position where the cutting edge of the cutter 15 can bite into the retention roller 14a slightly inside the surface of the retention roller 14a, and move backward up to a position where a space large enough to insert the fiber material A1 therein can be formed between the retention roller 14a and the cutting edge of the cutter 15.

When the crank 21 is driven and rotated, the cutter 15 moves in the direction approaching the retention roller 14a and the direction leaving the retention roller 14a alternately through the rod 22. The retention roller 14a rotates at a required timing when the cutter 15 leaves the retention roller 14a. Thus, a prescribed amount of the fiber material A1 is fed out. The cutter 15 moves in the direction approaching the retention roller 14a after the fiber material A1 has been fed out. Then, the cutting edge of the cutter 15 is pressed against the surface of the retention roller 14a. Thus, a front end portion of the fiber material A1 is cut off. As a result, fiber material pieces A2 each having a prescribed length are obtained. In this manner, the retention roller 14a is used as a cutter receiver in the plasticizing unit in this example. Therefore, it is unnecessary to prepare a separate cutter receiving member. Consequently, the fiber supply device 3 and hence the plasticizing unit can be implemented compactly and at low cost. Incidentally, the cutter 15 may be driven and reciprocated multiple times in one cycle between when the composite material is discharged from the heating cylinder 1 and when a next composite material is discharged. In this case, the number of times of reciprocation of the cutter 15 can be adjusted in accordance with a fiber amount which should be added into the composite material.

The cutting section 12 may include a hammer mechanism which gives impulse force to the cutter 15 pressed against the fiber material A1 to thereby cut off the fiber material A1 by the impulse force given to the cutter 15. When the impulse force of the hammer is given to the cutter 15, large force acts on the fiber material A1 instantaneously. Accordingly, the fiber material A1 can be cut off more easily and more reliably in comparison with a case where the cutter 15 is merely pressed.

Figure 2:
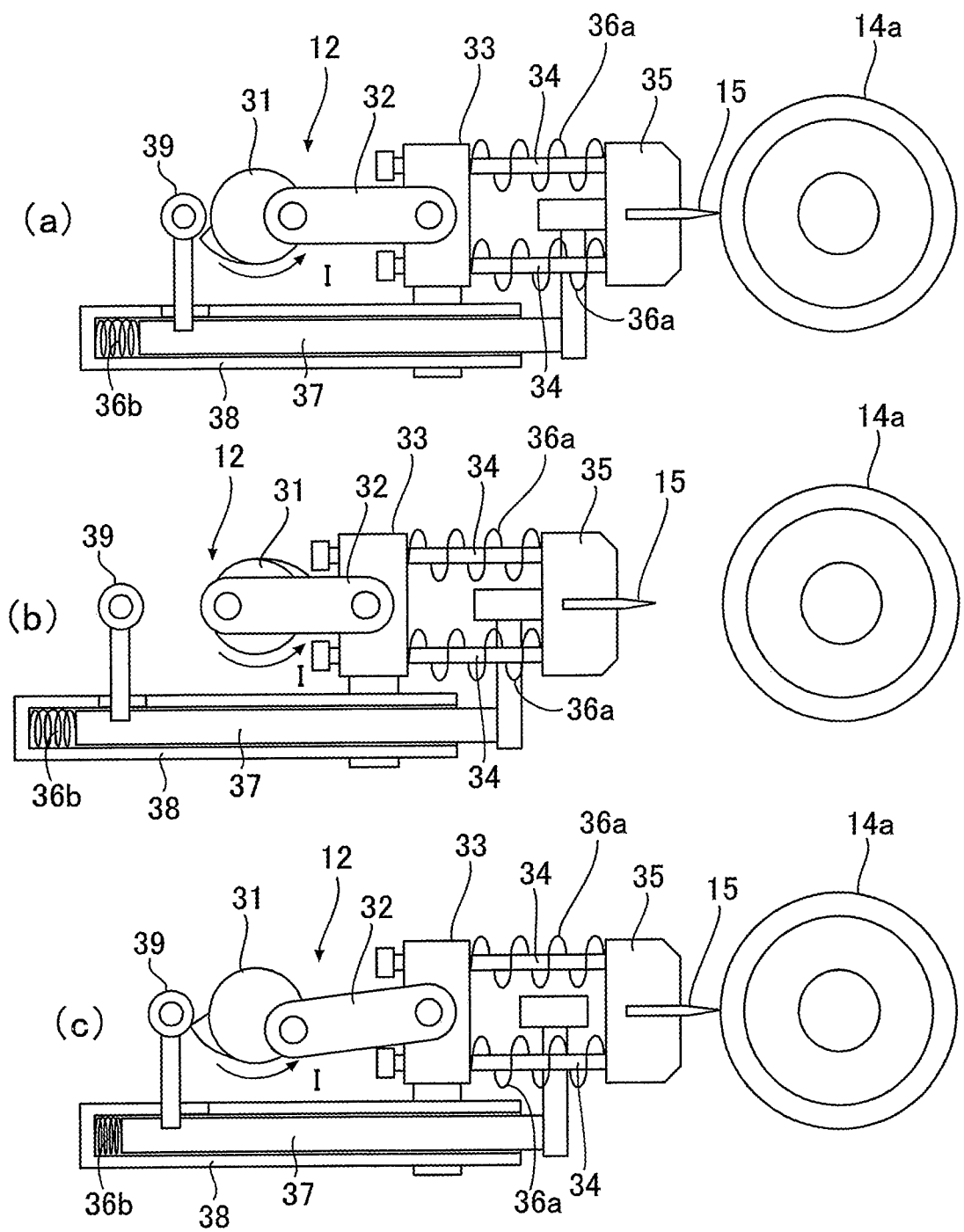
FIG. 2 Configuration views of a cutting section including a hammer mechanism according to the embodiment.

FIG. 2 show an example of the cutting section 12 including the hammer mechanism. The cutting section 12 in this example includes a cam plate 31, a slider 33, sliding pins 34, and a cutter holder 35. The cam plate 31 is driven and rotated by a motor. The slider 33 is coupled to the cam plate 31 through a rod 32. The sliding pins 34 are retained slidably along a movement direction of the slider 33. The cutter holder 35 is fixed to front end portions of the sliding pins 34. First spring members 36a for always urging the cutter holder 35 toward the retention roller 14a are provided between the slider 33 and the cutter holder 35. In addition, the cutting section 12 in this example includes a hammer 37, and a hammer retaining member 38. The hammer 37 is formed substantially into a U-shape. The hammer retaining member 38 retains the hammer 37. The hammer retaining member 38 is fixed to the slider 33. A second spring member 36b for always urging the hammer 37 toward the cutter holder 35 is provided between the hammer retaining member 38 and the hammer 37. One end of the hammer 37 is disposed on a back surface side of the cutter holder 35. The other end of the hammer 37 is disposed in a required position where the other end of the hammer 37 can be operated by the cam plate 31. The numeral 39 designates a roller provided at the other end of the hammer 37.

When the cam plate 31 in the hammer mechanism-including cutting section 12 configured as described above is rotated in a direction of an arrow I, the position of the cutter 15 changes in a sequence of FIG. 2(a), FIG. 2(b) and FIG. 2(c). First, in a state in which the roller 39 is separate from a cam surface of the cam plate 31 as shown in FIG. 2(b), the slider 33, the cutter holder 35 and the cutter 15 are located separately from the retention roller 14a. In this state, the hammer 37 is brought into close contact with the back surface side of the cutter holder 35 by elastic force of the second spring member 36b. When the cam plate 31 rotates to arrive at a position where a maximum lift point of the cam plate 31 presses the roller 39, the slider 33, the cutter holder 35 and the cutter 15 move forward to press the cutting edge of the cutter 15 against the retention roller 14a, as shown in FIG. 2(c). In this state, the other end portion of the hammer 37 is separate from the back surface of the cutter holder 35. When the cam plate 31 further rotates to allow the maximum lift point of the cam plate 31 to climb over the roller 39, the hammer 37 is driven and moved forward by the elastic force of the second spring member 36b so that an end portion of the hammer 37 can hit the back surface of the cutter holder 35 toward the retention roller 14a, as shown in FIG. 2(a). In this manner, the hammer 37 can give impulse force to the cutter 15.

The pressure-feeding section 13 has a pressing cylinder 41, a pressing piston 42, an actuator 43, a fiber supply pipe 44, and a fiber transfer device 45. The pressing piston 42 is received slidably inside the pressing cylinder 41. The actuator 43 such as an air cylinder drives and reciprocates the pressing piston 42. Through the fiber supply pipe 44, a head chamber 41a of the pressing cylinder 41 and the cutting section 12 can communicate with each other. The fiber transfer device 45 forcibly transfers the fiber material pieces A2 staying in the cutting section 12 and inside the fiber supply pipe 44 into the head chamber 41a of the pressing cylinder 41.

The pressing cylinder 41 is constituted by a circularly cylindrical body opened at its opposite ends. The pressing cylinder 41 is attached to the heating cylinder 1 so that the opening at the lower end portion of the pressing cylinder 41 can communicate with the fiber supply hole 1a. In addition, the actuator 43 is attached to the upper end portion of the pressing cylinder 41. The pressing piston 42 is coupled to a drive shaft 43a of the actuator 43 to be driven and reciprocated inside the pressing cylinder 41 by the actuator 43. One end of the fiber supply pipe 24 is coupled to a lower portion of the pressing cylinder 41. An air exhaust pipe 46 is provided in an upper portion of the pressing cylinder 41.

In the example of FIG. 1, a vacuum device (vacuum pump) coupled to the air exhaust pipe 46 is provided as the fiber transfer device 45. When the vacuum device 45 is activated, the fiber material pieces A2 staying in the cutting section 12 and inside the fiber supply pipe 44 can be sucked into the head chamber 41a of the pressing cylinder 41 through a rod chamber 41b of the pressing cylinder 41, a gap between an inner surface of the pressing cylinder 41 and an outer surface of the pressing piston 42 and the head chamber 41a of the pressing cylinder 41. Accordingly, even when the fiber material pieces A2 are gathered like a ball in the cutting section 12 or inside the fiber supply pipe 44 or deposited on a wall surface of the cutting section 12 or the fiber supply pipe 44, the fiber material pieces A2 can be forcibly transferred into the head chamber 41a of the pressing cylinder 41 by force of an air current. Accordingly, a fiber amount of the fiber material pieces A2 supplied into the heating cylinder 1 each cycle can be made stable so that a homogeneous composite material can be manufactured. In addition, since the gap between the inner surface of the pressing cylinder 41 and the outer surface of the pressing piston 42 is made so small that the fiber material pieces A2 cannot pass through the gap easily, a filter for preventing the fiber material pieces A2 from being diffused can be removed from the pressure-feeding section 13 in this configuration. Consequently, the fiber supply device 3 and hence the plasticizing unit can be implemented at low cost. In order to more reliably prevent the fiber material pieces A2 from being diffused, it is however a matter of course that the filter may be provided inside the air exhaust pipe 46.

Figure 3:
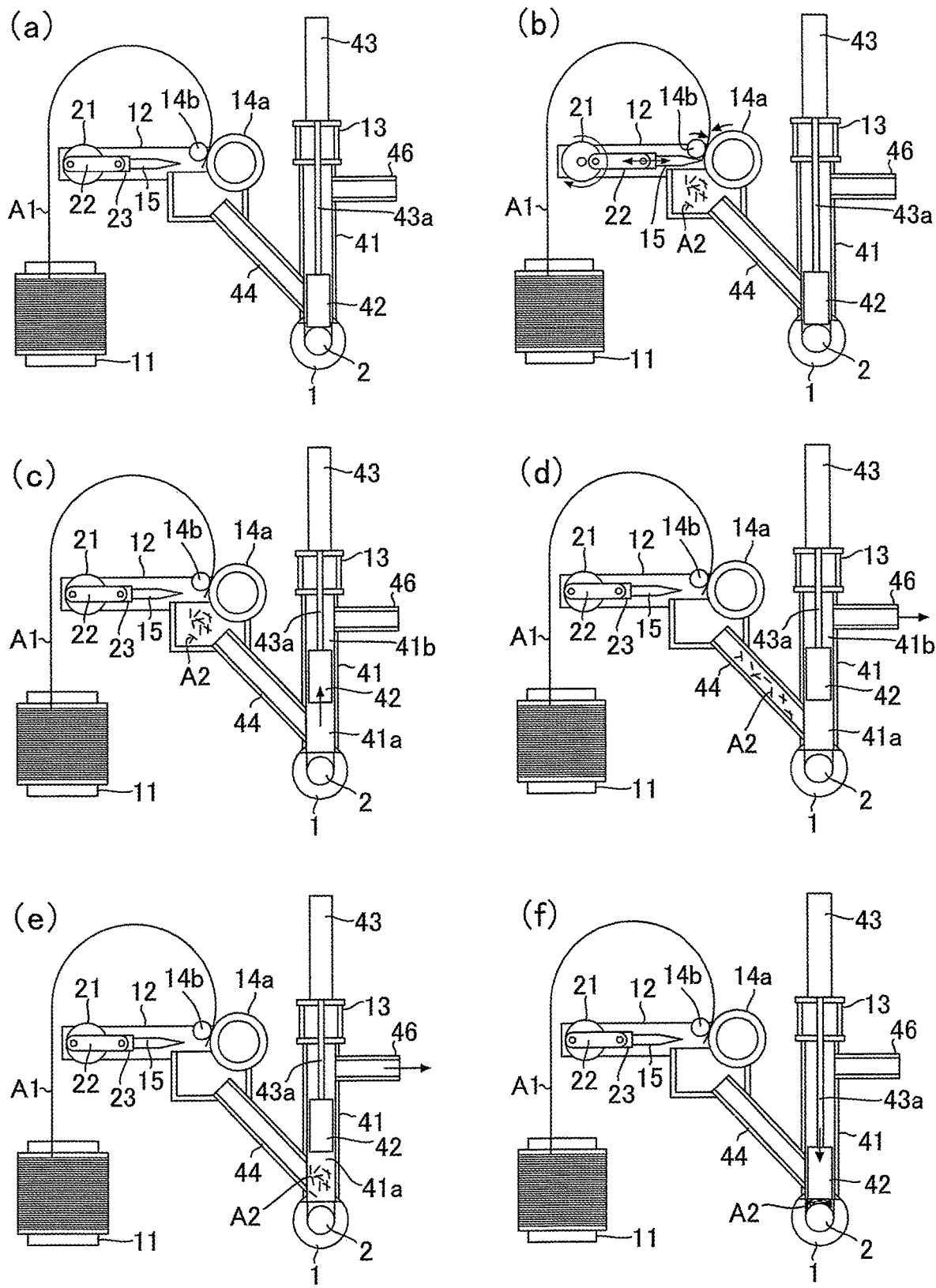
FIG. 3 Views for explaining operation of the plasticizing unit according to the embodiment.

Operation of the plasticizing unit according to the embodiment will be described below using FIG. 3.

As shown in FIG. 3(a), when a fiber supply step for a previous cycle has been completed, none of the fiber material pieces A2 stays behind in the cutting section 12 (including a state in which almost none of the fiber material pieces A2 stays behind) and the retention rollers 14a and 14b are suspended. In addition, the piston 42 moves down to the lower end portion to close the fiber supply pipe 44. At the same time, the piston 42 leaves the air exhaust pipe 46 open.

When a fiber supply step for a next cycle is started, the retention rollers 14a and 14b are rotated in directions of arrows to feed out a prescribed length of the fiber material A1 under the retention rollers 14a and 14b, as shown in FIG. 3(b). After the prescribed length of the fiber material A1 has been fed out under the retention rollers 14a and 14b, the cutter 15 either starts to be driven and moved forward to bring its cutting edge into contact with the surface of the retention roller 14a or moves forward until the cutter 15 bites into the retention roller 14a inside the surface of the retention roller 14a. In this manner, the fiber material A1 is cut off between the cutter 15 and the retention roller 14a, and the fiber material pieces A2 each having the prescribed length are accumulated in a bottom portion of the cutting section 12. In addition, a portion of the fiber material pieces A2 enter the fiber supply pipe 44. The cutter 15 which has cut off the fiber material A1 moves backward to its original position in accordance with rotation of the crank 21, as shown in FIG. 3(c).

After the fiber material A1 has been cut off, the actuator 43 provided in the pressure-feeding portion 13 is activated to drive and move up the pressing piston 42, as shown in FIG. 3(c). In this manner, the fiber supply pipe 44 and the head chamber 41a of the pressing cylinder 41 can communicate with each other. Incidentally, also when the pressing piston 42 is moved up, the air exhaust pipe 46 is maintained in an open state as it is.

After the pressing piston 42 has been moved up, the vacuum device 45 (see FIG. 1) is activated to evacuate air from the rod chamber 41b of the pressing cylinder 41 communicating with the air exhaust pipe 46, the head chamber 41a of the pressing cylinder 41, the fiber supply pipe 44 and the cutting section 12. In this manner, an air pressure difference is generated between the cutting section 12 and the head chamber 41a of the pressing cylinder 41. As a result, the cut fiber material pieces A2 which have been accumulated in the bottom portion of the cutting section 12 and the cut fiber material pieces A2 which have entered the fiber supply pipe 44 move to the head chamber 41a of the pressing cylinder 41 through the fiber supply pipe 44, as shown in FIGS. 3(d) and 3(e).

Thereafter, as shown in FIG. 3(f), the actuator 43 is activated to move down the piston 42 to press the fiber material pieces A2 into the heating cylinder 1 through the fiber supply hole 1a.

In the plasticizing unit according to the embodiment, the pressure-feeding section 13 of the fiber supply device 3 includes the vacuum device 45 by which the fiber material pieces A2 each cut in the prescribed length by the cutting section 12 can be forcibly moved into the head chamber 41a of the pressing cylinder 41 through the fiber supply pipe 44. Accordingly, a prescribed amount of the fiber material pieces A2 obtained by the cutting section 12 can be reliably pressed into the heating cylinder 1 each cycle. Consequently, a ratio of the fiber material contained in a plasticized resin can be made stable through all the cycles so that a homogeneous composite material can be manufactured continuously.

Figure 4:
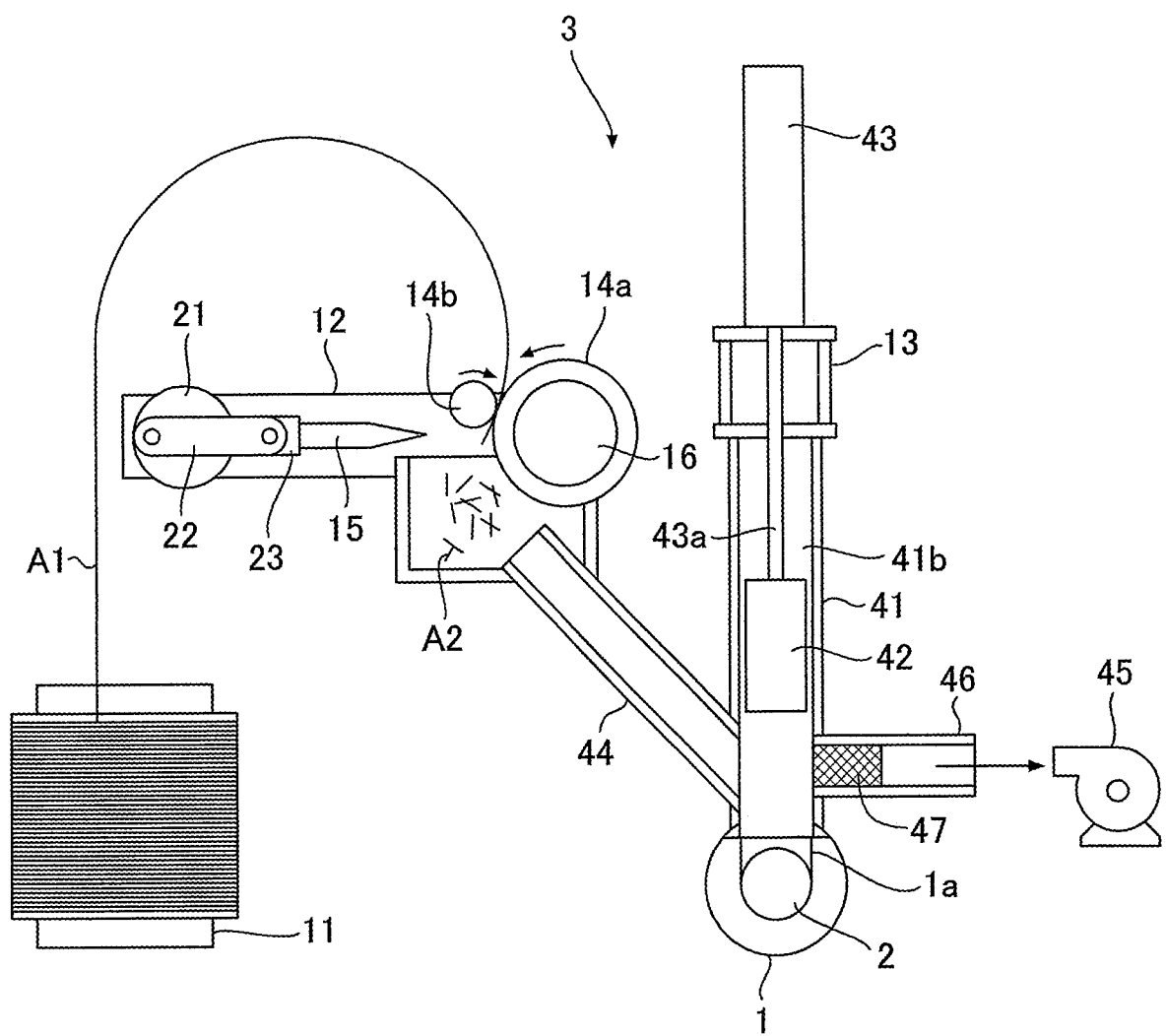
FIG. 4 Another configuration view of the plasticizing unit according to the embodiment.

Incidentally, in the aforementioned embodiment, the air exhaust pipe 46 is coupled to the upper portion of the pressing cylinder 41. However, the air exhaust pipe 46 may be coupled to the lower portion of the pressing cylinder 41, as shown in FIG. 4. In this case, a filter 47 for preventing the fiber material pieces A2 from being diffused is provided inside the air exhaust pipe 46. In order to eliminate a variation in the supply amount of the fiber material pieces A2, it is desirable that an inner surface of the filter 47 and the inner surface of the pressing cylinder 41 are disposed in positions of same plane. When the air exhaust pipe 46 is coupled to the lower portion of the pressing cylinder 41, stronger sucking force of the vacuum device 45 can be applied to the fiber material pieces A2 in the cutting section 12 and inside the fiber supply pipe 44, in comparison with the case where the air exhaust pipe 46 is coupled to the upper portion of the pressing cylinder 41. Accordingly, the fiber material pieces A2 can be more reliably transferred from the cutting section 12 and the fiber supply pipe 44 into the head chamber 41a of the pressing cylinder 41.

Figure 5:
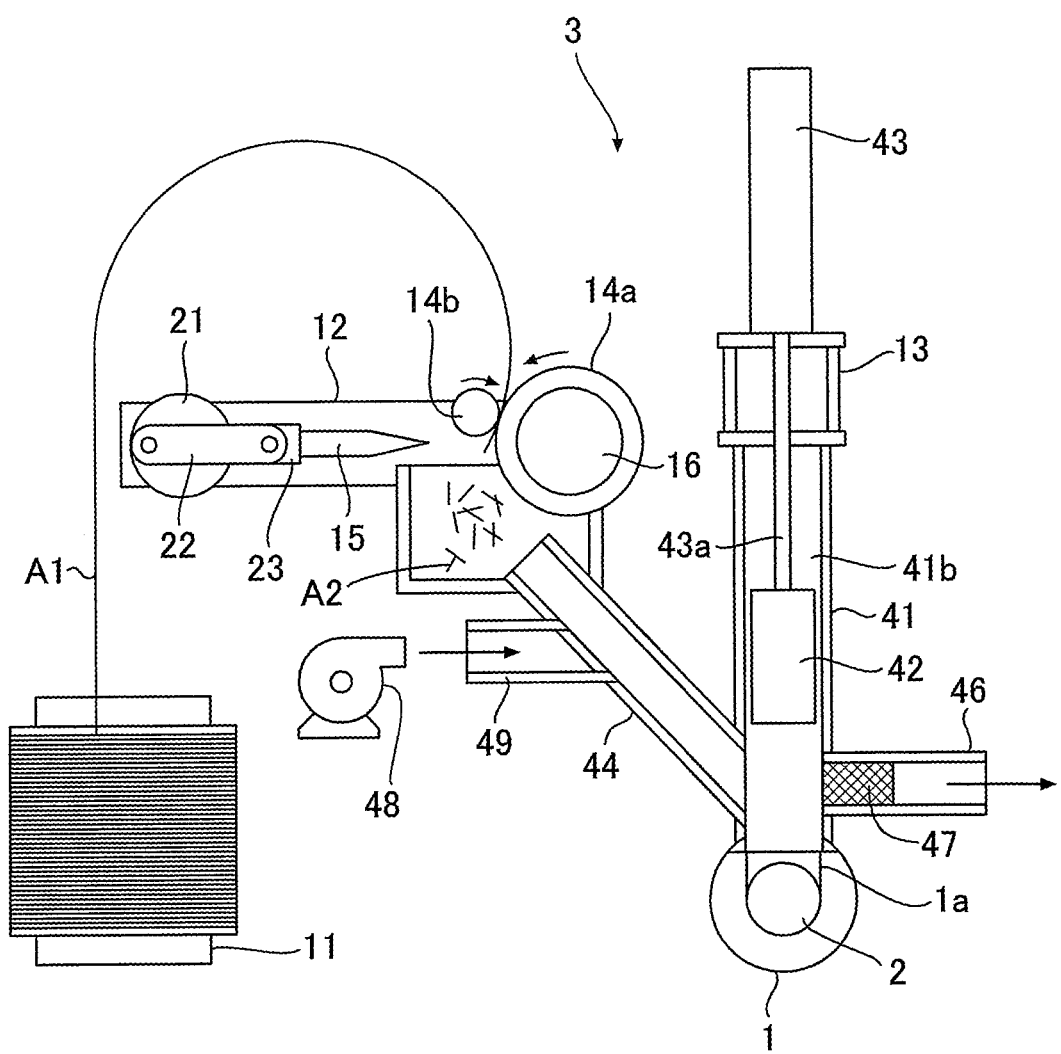
FIG. 5 A further configuration view of the plasticizing unit according to the embodiment.

In addition, in the aforementioned embodiment, the vacuum device 45 which serves as the fiber transfer device is coupled to the pressing cylinder 41. However, configuration may be made in such a manner that an air blowing device 48 which serves as the fiber transfer device is coupled to an air supply pipe 49 provided in the fiber supply pipe 44, as shown in FIG. 5. In this case, the air exhaust pipe 46 in which the filter 47 is provided is coupled to the pressing cylinder 41 in order to transfer the fiber material pieces A2 more reliably. In this manner, internal pressure of the fiber supply pipe 44 can be made negative due to an air current supplied from the air blowing device 48. The fiber material pieces A2 staying in the cutting section 12 can be drawn into the fiber supply pipe 44. At the same time, the fiber material pieces A2 staying inside the fiber supply pipe 44 can be pressed by the air current to be transferred to the head chamber 41a of the pressing cylinder 41. Consequently, a homogeneous composite material can be manufactured continuously also by this configuration. It is a matter of course that the vacuum device 45 and the air blowing device 48 may be used together.

Further, in the aforementioned embodiment, the screw 2 is received rotatably and movably forward/backward inside the heating cylinder 1. However, configuration may be made in such a manner that the screw 2 is received only rotatably inside the heating cylinder 1. In this case, a composite material is pushed out continuously from the front end portion of the heating cylinder 1 by the feed function of the screw 2.

REFERENCE SIGNS LIST

1 . . . heating cylinder, 1a . . . fiber supply hole, 2 . . . screw, 3 . . . fiber supply device, 11 . . . reel, 12 . . . cutting section, 13 . . . pressure-feeding section, 14a, 14b . . . retention roller, 15 . . . cutter, 16 . . . motor, 17 . . . rotary drum, 21 . . . crank, 22 . . . rod, 23 . . . slider also serving as cutter holder, 31 . . . cam plate, 32 . . . hammer member, 33 . . . elastic member, 41 . . . pressing cylinder, 42 . . . pressing piston, 43 . . . actuator such as air cylinder, 43a . . . drive shaft of actuator, 44 . . . fiber supply pipe, 45 . . . fiber transfer device (vacuum device, air blowing device), 46 . . . air exhaust pipe, 47 . . . filter, 48 . . . air blowing device, 49 . . . air supply pipe

The invention claimed is:

1. A plasticizing unit comprising: a heating cylinder; a screw that is received rotatably inside the heating cylinder; a resin supply hole and a fiber supply hole that are opened in the heating cylinder; and a fiber supply device that supplies a fiber material into the heating cylinder through the fiber supply hole; wherein:

the fiber supply device includes at least one reel on which a long fiber material is wound, a cutting section by which the long fiber material pulled out from the reel is cut off into a prescribed length, and a pressure-feeding section by which fiber material pieces each cut in the prescribed length by the cutting section are pressed into the heating cylinder through the fiber supply hole;

the pressure-feeding section has a pressing cylinder that is attached to the heating cylinder so that one end of the pressing cylinder can communicate with the fiber supply hole, a pressing piston that is received slidably inside the pressing cylinder, a fiber supply pipe through which a head chamber of the pressing cylinder and the cutting section can communicate with each other, and a fiber transfer device by which the fiber material pieces staying in the cutting section and inside the fiber supply pipe are transferred into the head chamber of the pressing cylinder; and the fiber transfer device includes a vacuum device that is coupled to the pressing cylinder to suck the fiber material pieces staying in the cutting section and inside the fiber supply pipe into the head chamber of the pressing cylinder, an air exhaust pipe communicating with the vacuum device is provided on a rod chamber side of the pressing cylinder, and the vacuum device sucks the fiber material pieces staying in the cutting section and inside the fiber supply pipe through a gap between an inner surface of the pressing cylinder and an outer surface of the pressing piston, and an air exhaust pipe communicating with the vacuum device is provided on a head chamber side of the pressing cylinder, and a filter for preventing the fiber from being diffused is provided in the air exhaust pipe.

2. A plasticizing unit according to claim 1, wherein: the cutting section has retention rollers that retain a front end portion of the fiber material pulled out from the reel and one of which is driven to rotate in one direction intermittently to feed out a predetermined length of the fiber material in each intermittent rotation, and a cutter that is disposed to be opposed to the one retention roller so that a cutting edge of the cutter can be pressed against a surface of the one retention roller to thereby cut off the front end portion of the fiber material fed out by the one retention roller.

3. A plasticizing unit according to claim 2, wherein: a flat blade cutter having a linear cutting edge is used as the cutter.

4. A plasticizing unit according to claim 2, wherein: a rotary cutter having a circular or arc cutting edge is used as the cutter.

5. A plasticizing unit according to claim 2, wherein: the cutting section includes a hammer that gives impulse force to the cutter pressed against the fiber material so that the fiber material can be cut off by the impulse force applied to the cutter.

6. A plasticizing unit comprising: a heating cylinder; a screw that is received rotatably inside the heating cylinder; a resin supply hole and a fiber supply hole that are opened in the heating cylinder; and a fiber supply device that supplies a fiber material into the heating cylinder through the fiber supply hole; wherein:

the fiber supply device includes at least one reel on which a long fiber material is wound, a cutting section by which the long fiber material pulled out from the reel is cut off into a prescribed length, and a pressure-feeding section by which fiber material pieces each cut in the prescribed length by the cutting section are pressed into the heating cylinder through the fiber supply hole;

the pressure-feeding section has a pressing cylinder that is attached to the heating cylinder so that one end of the pressing cylinder can communicate with the fiber supply hole, a pressing piston that is received slidably inside the pressing cylinder, a fiber supply pipe through which a head chamber of the pressing cylinder and the cutting section can communicate with each other, and a fiber transfer device by which the fiber material pieces staying in the cutting section and inside the fiber supply pipe are transferred into the head chamber of the pressing cylinder; and an air blowing device for blowing air into the fiber supply pipe is provided as the fiber transfer device, and an air exhaust pipe is provided on a head chamber side of the pressing cylinder.

7. A plasticizing unit according to claim 6, wherein: the cutting section has retention rollers that retain a front end portion of the fiber material pulled out from the reel and one of which is driven to rotate in one direction intermittently to feed out a predetermined length of the fiber material in each intermittent rotation, and a cutter that is disposed to be opposed to the one retention roller so that a cutting edge of the cutter can be pressed against a surface of the one retention roller to thereby cut off the front end portion of the fiber material fed out by the one retention roller.

8. A plasticizing unit according to claim 7, wherein: a flat blade cutter having a linear cutting edge is used as the cutter.

9. A plasticizing unit according to claim 7, wherein: a rotary cutter having a circular or arc cutting edge is used as the cutter.

10. A plasticizing unit according to claim 7, wherein: the cutting section includes a hammer that gives impulse force to the cutter pressed against the fiber material so that the fiber material can be cut off by the impulse force given to the cutter.

* * * * *